United States Patent
Chang et al.

(10) Patent No.: US 11,163,988 B2
(45) Date of Patent: Nov. 2, 2021

(54) SELECTIVE INTERACTIVE EVENT TRACKING BASED ON USER INTEREST

(71) Applicant: International Business Machines Corporation, Armonk, NY (US)

(72) Inventors: Chiwen Chang, Taipei (TW); Ci-Wei Lan, Keelung (TW); Hao Chun Hung, Taipei (TW); Tsai-Hsuan Hsieh, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 16/699,958

(22) Filed: Dec. 2, 2019

(65) Prior Publication Data

US 2021/0166004 A1    Jun. 3, 2021

(51) Int. Cl.
*G06K 9/00* (2006.01)
*G06K 9/62* (2006.01)

(52) U.S. Cl.
CPC ....... *G06K 9/00302* (2013.01); *G06K 9/6254* (2013.01); *G06K 9/6257* (2013.01)

(58) Field of Classification Search
None
See application file for complete search history.

(56) References Cited

U.S. PATENT DOCUMENTS

| 8,606,725 | B1 | 12/2013 | Agichtein et al. | |
| 2018/0335930 | A1* | 11/2018 | Scapel | G06K 9/00315 |
| 2019/0124167 | A1 | 4/2019 | Reshef et al. | |
| 2019/0205626 | A1* | 7/2019 | Kim | G06K 9/00228 |
| 2019/0278978 | A1* | 9/2019 | Park | G06K 9/00302 |
| 2019/0289225 | A1* | 9/2019 | Vonikakis | H04N 5/23219 |
| 2020/0005364 | A1* | 1/2020 | Aznaurashvili | G06Q 30/0281 |
| 2020/0114521 | A1* | 4/2020 | Mahoor | B25J 9/1697 |

FOREIGN PATENT DOCUMENTS

| CN | 109165494 | A | * | 1/2019 |
| CN | 110414371 | A | * | 11/2019 |

OTHER PUBLICATIONS

Patel, N., "How to Use a Website Click Tracking Tool to Improve the User Experience," The Daily Egg, Sep. 6, 2018, 18 pages, https://www.crazyegg.com/blog/website-click-tracking/.
Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

*Primary Examiner* — Mohammed Rachedine
(74) *Attorney, Agent, or Firm* — Kelsey M. Skodje (57) ABSTRACT

A system, method, and computer program product for tracking interactive events. Facial expression data and interactive event data are received. A new facial expression is detected in the facial expression data, and the new facial expression and corresponding interactive event data are recorded. The new facial expression is recognized based on training data, and in response, a definition is assigned to the new facial expression. The corresponding interactive event data is tagged with the definition.

20 Claims, 5 Drawing Sheets

SELECTIVE INTERACTIVE EVENT TRACKING BASED ON USER INTEREST

BACKGROUND

The present disclosure relates to tracking interactive events and, more specifically, to selecting interactive data to record based on a detected user interest.

Interactive event tracking (e.g., click tracking) is an analytical technique used to measure and tag where users carry out interactive events (e.g., clicking or tapping on elements such as links, commands, pop-up windows, etc.) in a user interface of a website, software application, etc. Other types of interactive events, e.g., cursor movements, exiting a window or site, etc., can be tracked as well. This provides information about how users interact with user interfaces, such as which elements users are most interested in. Interactive events that are recorded can be tagged with information such as the category of element selected (e.g., retail websites, news articles, etc.).

SUMMARY

Embodiments of the present disclosure are directed to a system for tracking interactive events. The system includes at least one processing component, at least one memory component, a set of training data that includes defined facial expressions, at least one image sensor that collects facial expression data, and at least one interactive device that collects interactive event data. The system also includes a detection module that detects a new facial expression in the facial expression data, and in response, records the new facial expression and corresponding interactive data. Further, the system includes an expression classifier that recognizes the new facial expression based on the training data, and in response, assigns a definition associated with a defined facial expression to the new facial expression. The new facial expression and definition can be added to the training data, and the expression classifier can then be retrained. The expression classifier can determine that the defined facial expression matches the new facial expression, or that the defined facial expression is the most similar to the new facial expression. The system also includes a tagging module that tags the corresponding interactive event data with the definition. The tagging module can also add the tagged interactive data to a set of profile data.

Additional embodiments of the present disclosure are directed to a method of tracking interactive events, which includes receiving facial expression data and interactive event data. A new facial expression is detected in the facial expression data, and the new facial expression and corresponding interactive event data (e.g., clicking on a link) are recorded. The new facial expression is recognized based on training data, and in response, a definition is assigned to the new facial expression. The corresponding interactive event data is tagged with the definition. The recognizing can be based on locating a defined facial expression that matches the new facial expression or, when there is no matching expression, locating a defined facial expression that is the most similar to the new facial expression. The interactive event data corresponding to the new facial expression can be added to a set of profile data. The corresponding interactive event data can also be tagged with related information, such as a category of website.

Further embodiments of the present disclosure are directed to a computer program product, which includes a computer readable storage medium having program instructions embodied therewith, the program instructions executable by a processor to cause a device to perform a method of tracking interactive events, which includes receiving facial expression data and interactive event data. A new facial expression is detected in the facial expression data, and the new facial expression and corresponding interactive event data are recorded. The new facial expression is recognized based on training data, and in response, a definition is assigned to the new facial expression. The corresponding interactive event data is tagged with the definition. The recognizing can be based on locating a defined facial expression that matches the new facial expression or, when there is no matching expression, locating a defined facial expression that is the most similar to the new facial expression. The interactive event data corresponding to the new facial expression can be added to a set of profile data. The corresponding interactive event data can also be tagged with related information.

DETAILED DESCRIPTION

Interactive event tracking, such as click tracking, is used to measure and tag how users select (e.g., via clicking or tapping) elements (e.g., links, commands, pop-up windows, etc.) in a user interface of a website, software application, etc. Other types of interactive events, e.g., cursor movements, exiting a window or site, etc., can be tracked as well. This provides information about users' interests and habits, such as what types of content (e.g., products, genres, news topics, etc.) a user most frequently selects. However, recording each interactive event results in a large amount of data, much of which is not analytically useful. Therefore, conditional filtering techniques are needed to reduce the volume of data and increase the efficiency of interactive event tagging and analysis.

Disclosed herein are techniques for selectively recording and tagging interactive events based on detected user interests. Users enable a camera (e.g., a webcam) to record their facial expressions while they are interacting with various user interfaces, such as website interfaces. A baseline facial expression can be established for a user via a set of facial image training data. A variety of other facial expressions (e.g., expressions associated with happiness, interest, confusion, etc.) can also be established based on this training data. When a change from one expression to another is detected, the new expression can be identified (e.g., as a smile) and assigned a definition (e.g., happiness), and any interactive events that occurred at the time of the recognized new facial expression can be recorded. Each recorded interactive event can be tagged with a definition of its corresponding facial expression, interactive event type (e.g., a click on a particular link), user identity, device on which the interactive event occurred (e.g., a tablet computer, a desktop computer, etc.), etc. The recognized facial expression and its definition can be added to the facial image training data, which can provide greater accuracy in recognizing future new facial expressions.

Figure 1:
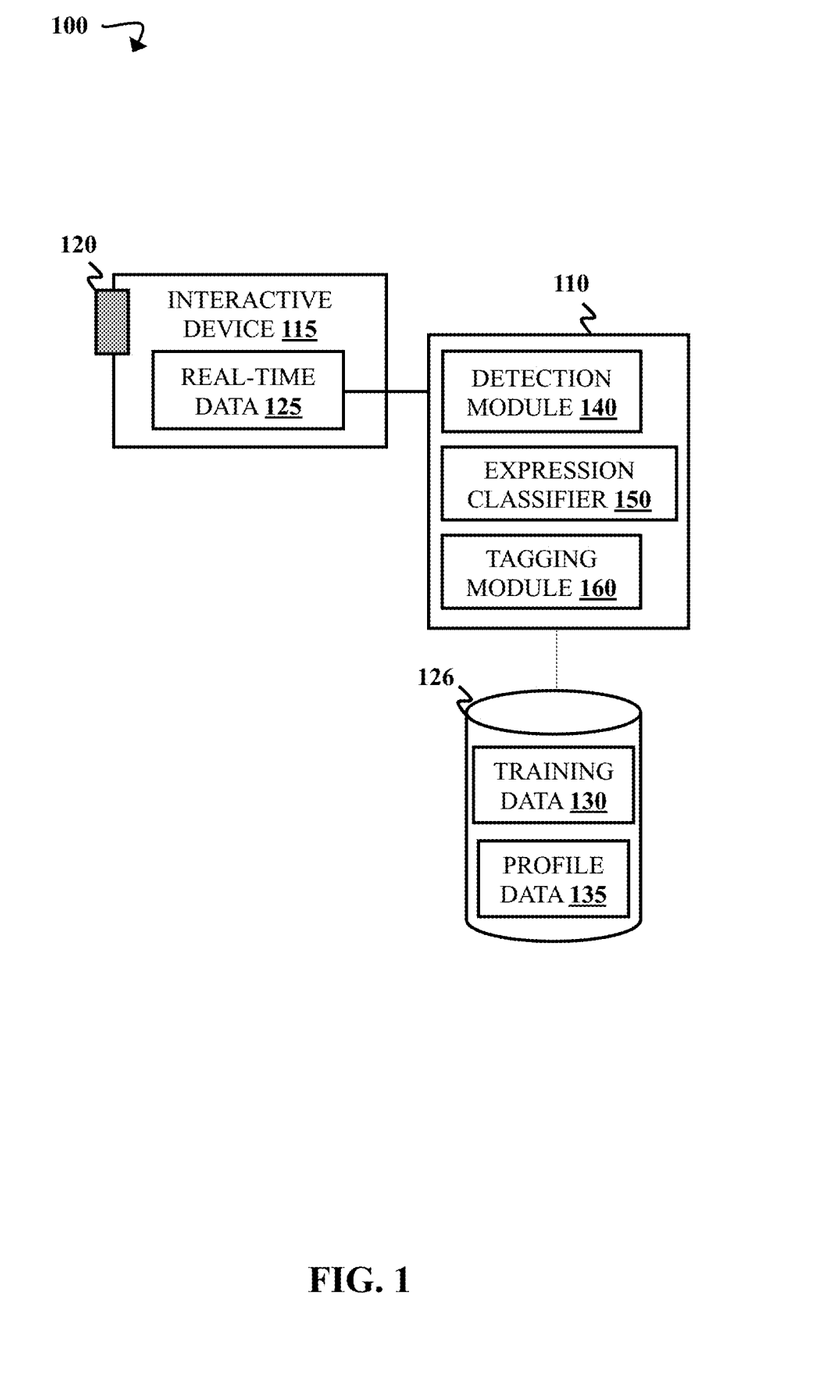
FIG. 1 is a block diagram illustrating an interactive event tracking environment, according to some embodiments of the present disclosure.

FIG. 1 is a block diagram illustrating an interactive event tracking environment 100, according to some embodiments of the present disclosure. The interactive event tracking environment 100 includes an analysis component 110, an interactive device 115 and camera 120 for gathering a set of real-time data 125, and a storage component 126, which includes a set of training data 130 and a set of profile data 135. The analysis component 110 includes a detection module 140, an expression classifier 150, and a tagging module 160.

The real-time data 125 includes facial expression data and interactive event data collected by at least one interactive device 115 and at least one camera 120. In some embodiments, other image sensors (e.g., structured-light 3D scanners, thermographic imagers, hyperspectral imagers, etc.) can be used in addition to or instead of the camera 120 in order to collect facial expression data. The real-time facial expression data is continuously gathered by the camera 120 when the user enables data collection (e.g., by selecting an option for tracking facial expression and interactive event data). The facial expression data includes graphical images of the user's face collected by the camera 120 as digital video or still image data. The images can be 2- or 3-dimensional (2D or 3D) images.

The camera 120 is built into, or otherwise in communication with, the interactive device 115. The interactive device 115 is a computing device (e.g., a mobile computing device, a laptop computer, a desktop computer, etc.) operated by the user during real-time data 125 collection. Interactive event data is entered by the user into the interactive device 115 while facial expression data is collected by the camera 120. The interactive event data component of the real-time data 125 is related to actions ("interactive events") carried out by the user via a user interface on the interactive device 115. For example, interactive events can include clicks, taps, selections, gestures, voice commands, typing, scrolling, cursor movements, etc. The interactive event data can be input via a pointing device (e.g., a computer mouse or trackball), keyboard, touchscreen, brain-computer interface (BCI), microphone, camera, motion detector, etc. that is built into, or otherwise in communication with, the interactive device 115. The interactive event data can be tagged, by the tagging module 160, with information related to the interactive events. For example, when the user selects a link by tapping on a touchscreen, the interactive event data can identify the time at which the tap was received, the identity of the link it was used to select, the category of information or website selected, etc. Tagging is discussed in greater detail below.

The detection module 140 monitors the facial expression data from the real-time data 125 in order to detect changes in the user's facial expressions. A facial expression change can be a change relative to a baseline facial expression generated based on the training data 130 (see below), or it can be any change from one expression to another. The detection module 140 can use any appropriate image recognition techniques for detecting expression changes in the real-time data 125. Examples of image recognition techniques that can be used are discussed in greater detail below.

When an expression change has been detected in the facial expression component of the real-time data 125, the detection module 140 records the new facial expression as at least one graphical image. The detection module also records interactive event data corresponding to the recorded new facial expression. The corresponding interactive event data is interactive event data received at the time of the change to the new facial expression (e.g., one or more seconds before the expression change, at the same time as the expression change, and/or one or more seconds after the expression change).

The image of the new facial expression is sent to the expression classifier 150, which determines an identity (e.g., a smile) of the new facial expression based on the training data 130, and assigns a definition associated with the expression identity to the recognized new facial expression. In order to recognize the new facial expression, the expression classifier 150 determines whether the new facial expression matches (e.g., has a similarity value above a similarity threshold) a facial expression in the training data 130. The expression classifier 150 is trained on the training data 130 in order to recognize new facial expressions. Examples of techniques that can be used to do so can include pattern detection algorithms, edge/contour/ridge detection, histogram analysis, artificial neural networks, convolutional neural networks, pre-trained recurrent neural network (RNN) classifiers, supervised machine learning algorithms, semi-supervised machine learning algorithms, unsupervised machine learning algorithms, shape recognition algorithms, cross correlation, dynamic time warping (DTW) algorithms, Hidden Markov Models (HMMs), etc. Additionally, the classifier 150 can identify facial expressions from the real-time data 125 using Facial Action Coding System (FACS).

The training data 130 can be from an existing facial expression database. Examples of facial expression databases that can be used can include the Belfast Naturalistic Database (Queen's University Belfast), the MMI Database (Delft University of Technology), the Extended Cohn-Kanade Dataset (CK+) (Carnegie Mellon University), etc. In some embodiments, the training data 130 can include, at least in part, a set of images of the user's face making a range of defined facial expressions. For example, the camera 120 can collect images of the user's face during a training period. A baseline facial expression can be established. For example, the most common facial expression detected in user-provided training data 130 can be defined as the baseline facial expression. Additionally, the baseline facial expression can be an expression defined as emotionally neutral by a facial expression database.

The definitions associated with the training facial expressions can also be provided by the user in some embodiments. For example, the user can report her mental state (e.g., interested, happy, excited, bored, etc.) at various points during the training data 130 collection period. The training facial expressions corresponding to the reports can then be tagged with their identified definitions, and added to the training data 130. The user can be prompted to enter a report at regular intervals and/or when carrying out an interactive event. Interactive event data corresponding to the training facial expressions can also be recorded, mapped to the appropriate facial expression.

The expression classifier 150 can determine that a new facial expression matches a defined facial expression in the training data 130. For example, a new facial expression can be identified as matching a defined facial expression when a similarity value for the two expressions is above a threshold similarity value (e.g., 95%, 99%, etc.). Techniques for determining similarity values can include the image recognition techniques identified above. The recognized new facial expression is then assigned the definition of the matching defined facial expression, and added to the training data.

Alternatively, the expression classifier 150 can determine that a new facial expression does not match any defined facial expressions in the training data 130. For example, the expression classifier 150 can determine that there are no facial expressions in the training data 130 having a similarity to the new facial expression greater than a threshold similarity value. In these instances, the expression classifier 150 can then locate a defined facial expression that is the most similar to the new facial expression. The definition of the most similar expression located can then be assigned to the new facial expression. There can be an additional threshold similarity value for locating the most similar facial expression. For example, a facial expression in the training data 130 with a similarity below a second threshold, e.g., 50%, may not be considered a close enough match to be similar to the received facial expression. In these instances, the new facial expression can be tagged as unrecognized.

When the expression classifier 150 has recognized and assigned a definition to the new facial expression, the tagging module 160 tags the interactive event data corresponding to the recognized new facial expression, and adds the tagged interactive event data to the profile data 135 for the user. The corresponding interactive event data is interactive event data entered at approximately the same time (e.g., within a range of ±5 seconds) as the new facial expression was detected. The tagging module 160 tags the corresponding interactive event data with information such as the definition associated with the recognized facial expression. This definition is the definition (e.g., curiosity) associated with the identity of the matching expression (e.g., a frown) in the training data 130. In an example, an interactive event can include clicking on a link to a website providing information about agriculture, and its corresponding facial expression can be recognized as a frown associated with the definition, "curiosity". The interactive event data can then be tagged with the identity and/or category of the link (e.g., the address of the website and at least one topic such as agriculture, specific crops and/or equipment, etc.) and the definition, "curiosity".

In some embodiments, the expression classifier 150 can compare interactive event data corresponding to a new facial expression to interactive event data corresponding to defined facial expressions in the training data 130. If the interactive event data for the new facial expression is related to the interactive event data for a defined facial expression, a similarity value for the new facial expression and the defined facial expression can be increased. In some embodiments, the interactive event data can be assigned a weight when determining the similarity value.

Related interactive event data can include sets of interactive event data tagged with similar categories, such as interactive events that involve selecting similar products (e.g., socks) or visiting similar websites (e.g., clothing retailers). In an example, interactive event data corresponding to a new facial expression can include clicking (e.g., via a computer mouse of a first interactive device 115) on a link to a website with information about laptop computers, and related interactive event data corresponding to a defined facial expression can include tapping (e.g., via a touchscreen of a second interactive device 115) on a link to a webpage with information about desktop computers. Both interactive events can therefore have tags indicating that they are related to selecting information about computing devices, and a similarity value for the new facial expression and the defined facial expression can be increased.

The tagging module 160 adds recognized expressions and their assigned definitions to the training data 130, allowing the expression classifier 150 to be retrained in order to more accurately identify facial expressions from future real-time data 125. Additionally, the tagging module 160 adds the tagged interactive event data corresponding to the recognized expression to the profile data 135. The profile data 135 provides information about the user's interests and habits based on his recorded facial expressions and corresponding interactive events. For example, recognized facial expressions that indicate interest and correspond to interactive events involving the selection of books within a particular genre can indicate that the user is interested in books and/or books in the particular genre.

Various machine learning techniques (e.g., k-nearest neighbor imputation, synthetic minority oversampling technique, multilinear logistic regression, mixture density network, Bayesian prediction, logistic regression, clustering algorithms, independent component analysis, Markov decision processes, etc.) can then be used to predict what additional content may also be of interest to the user (e.g., books and movies in the genre). The profile data 135 for the user can also be combined with profile data collected from other users in order to provide additional data for analytics.

Figure 2:
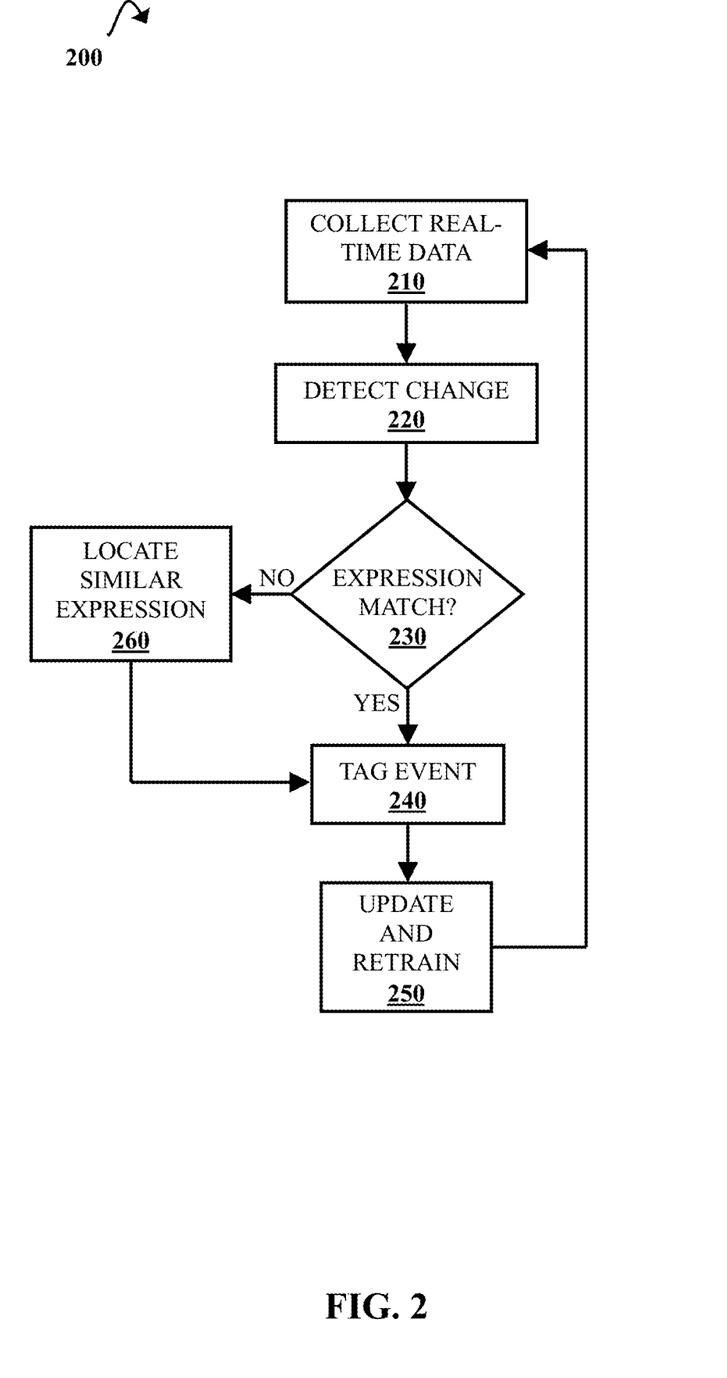
FIG. 2 is a flow diagram illustrating a process of tracking interactive events, according to some embodiments of the present disclosure.

FIG. 2 is a flow diagram illustrating a process 200 of tracking interactive events, according to some embodiments of the present disclosure. To illustrate process 200, but not to limit embodiments, FIG. 2 is described within the context of the interactive event tracking environment 100 of FIG. 1. Where elements described with respect to FIG. 2 are identical to elements shown in FIG. 1, the same reference numbers are used in both Figures.

Real-time data 125, which includes facial expression and interactive event data, is collected. This is illustrated at step 210. The real-time data 125 collection begins when a user has selected an option for enabling interactive event and facial expression data collection. The facial expression data is collected by a camera 120 photographing the user's face while the user interacts with an interactive device 115. In some embodiments, the facial expression data can be collected by another image sensing device (e.g., a 3D scanner, a thermographic imager, a hyperspectral imager, etc.) in addition to or instead of the camera 120. The facial expression data can be in the form of still image or video data, and can be 2D or 3D images.

The facial expression data is collected while the user carries out interactive events via an interactive device 115 (e.g., a laptop computer, a mobile computing device, a desktop computer, a tablet computer, etc.). The real-time interactive event data can be input using a pointing device (e.g., a computer mouse or trackball), keyboard, touchscreen, brain-computer interface (BCI), microphone, camera, motion detector, etc. In some embodiments, an interactive event includes selecting a link (e.g., by clicking with a pointing device or tapping on a touchscreen). Examples of interactive events are discussed in greater detail with respect to FIG. 1.

A change in the facial expression data component of the real-time data 125 is detected. This is illustrated at step 220. A detection module 140 receives the facial expression data, and detects differences in the user's expression relative to the previous images. The detection component 140 records image(s) depicting the new expression, as well as corresponding interactive event data. For example, the detection component 140 can record the interactive event data received at approximately (e.g., ±1-5 seconds) the same time as the new facial expression. In some embodiments, the detection component records the real-time data 125 only when the user's facial expression has changed relative to a baseline facial expression (e.g., a neutral expression). In other embodiments, the real-time data 125 is recorded when the detection module 140 detects any change from one expression to another.

It is then determined whether the new facial expression matches a defined facial expression. This is illustrated at step 230. The expression classifier 150 receives the real-time data 125 recorded by the detection module 140 upon detecting an expression change. The new facial expression is compared to a set of training data 130. The expression classifier 150 determines whether there is a defined facial expression in the training data 130 that matches the new facial expression. For example, the new facial expression and a defined facial expression can be identified as matching when they have a similarity of 95% or greater. Techniques for identifying a matching expression can include convolutional neural networks, edge/contour/ridge detection, histogram analysis, artificial neural networks, pre-trained recurrent neural network (RNN) classifiers, supervised machine learning algorithms, semi-supervised machine learning algorithms, unsupervised machine learning algorithms, shape recognition algorithms, cross correlation, dynamic time warping (DTW) algorithms, Hidden Markov Models (HMMs), etc.

If the new facial expression is recognized as matching a defined facial expression, its corresponding interactive event data is tagged with related information. This is illustrated at step 240. A tagging module 160 tags the interactive event data with a definition (e.g., curiosity) assigned to the recognized new facial expression. The definition is the definition associated with the matching defined facial expression. The interactive event data can also be tagged with the time at which the interactive event was recorded, the type of interactive event (e.g., a click or cursor movement), the category of content associated with the event (e.g., news, retail, education, etc.), more specific information about the content (e.g., a news article or a retail item), the identity of the facial expression (e.g., a frown), etc.

The training data 130 and a set of profile data 135 are then updated, and the expression classifier 150 is retrained. This is illustrated at step 250. The training data 130 is updated to include the recognized facial expression and its associated definition. This allows the expression classifier 150 to be retrained on the updated training data 130 for greater accuracy. The set of profile data 135 is updated to include the tagged interactive event data. The profile data 135 can also include information such as the user's browsing and/or purchase history, demographic information, etc. The profile data 135 can be used to generate a model for predicting the user's interests and habits. The profile data 135 can also be aggregated with data from other users, and used in various data analysis applications. For example, the profile data 135 can be used, alone or as part of a larger dataset, in descriptive, diagnostic, predictive, and/or prescriptive data analytics. When the updating and retraining have been carried out, process 200 can return to step 210 to continue collecting real-time data 125. In other embodiments, process 200 can end after step 250 (e.g., if real-time data 125 is no longer input or if instructions to stop process 200 are received).

However, if a matching defined facial expression is not found at step 230, the most similar defined facial expression is selected. This is illustrated at step 260. The expression classifier 150 can select a facial expression in the training data 130 that is the most similar to the new facial expression, despite not being close enough to match. For example, when a threshold similarity value for matching is 95%, the closest defined facial expression can have a similarity value of 80%. Other information can also be used to adjust the similarity scores. For example, facial expressions in the training data 130 that correspond to interactive event data similar (e.g., having at least one matching tag) to the new interactive event data can receive a higher similarity score.

The recognized facial expression is then defined by the definition of the most similar facial expression from the training data 130, and process 200 proceeds to step 240. However, in some embodiments it can be determined at step 260 that the new facial expression is unrecognized. For example, there may be no defined facial expressions with similarity scores over a second threshold similarity value (e.g., 50%, 30%, 25%, etc.). This is discussed in greater detail with respect to FIG. 1. In these instances, process 200 can end at step 260. This is not illustrated in FIG. 2.

Figure 3:
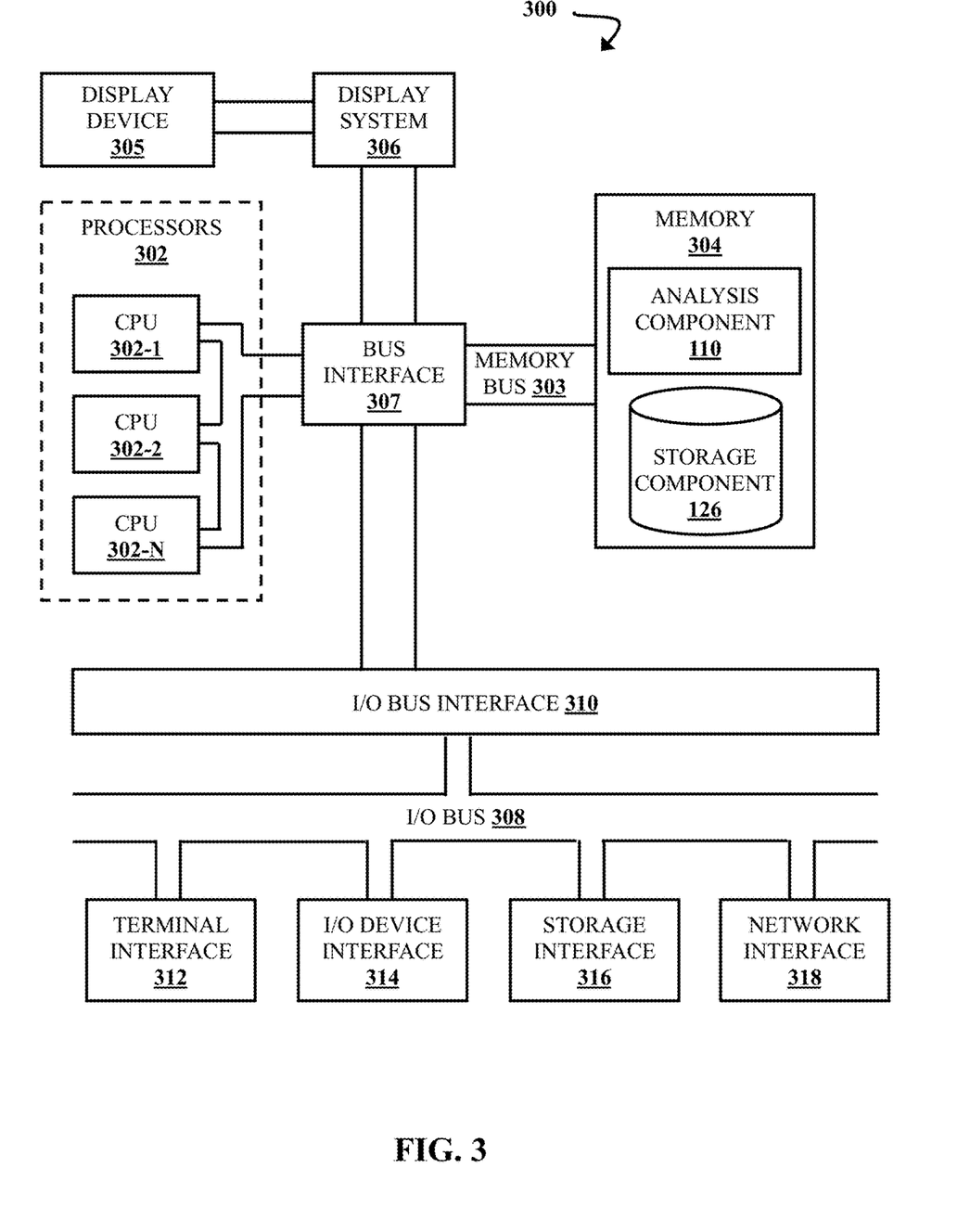
FIG. 3 is a block diagram illustrating a computer system, according to some embodiments of the present disclosure.

FIG. 3 is a high-level block diagram illustrating an exemplary computer system 300 that can be used in implementing one or more of the methods, tools, components, and any related functions described herein (e.g., using one or more processor circuits or computer processors of the computer). In some embodiments, the major components of the computer system 300 comprise one or more processors 302, a memory subsystem 304, a terminal interface 312, an input/output device interface 314, a storage interface 316, and a network interface 318, all of which can be communicatively coupled, directly or indirectly, for inter-component communication via a memory bus 303, an input/output bus 308, bus interface unit 307, and an input/output bus interface unit 310.

The computer system 300 contains one or more general-purpose programmable central processing units (CPUs) 302-1, 302-2, and 302-N, herein collectively referred to as the CPU 302. In some embodiments, the computer system 300 contains multiple processors typical of a relatively large system; however, in other embodiments the computer system 300 can alternatively be a single CPU system. Each CPU 302 may execute instructions stored in the memory subsystem 304 and can include one or more levels of on-board cache.

The memory 304 can include a random-access semiconductor memory, storage device, or storage medium (either volatile or non-volatile) for storing or encoding data and programs. In some embodiments, the memory 304 represents the entire virtual memory of the computer system 300, and may also include the virtual memory of other computer systems coupled to the computer system 300 or connected via a network. The memory 304 is conceptually a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures.

These components are illustrated as being included within the memory 304 in the computer system 300. However, in other embodiments, some or all of these components may be on different computer systems and may be accessed remotely, e.g., via a network. The computer system 300 may use virtual addressing mechanisms that allow the programs of the computer system 300 to behave as if they only have access to a large, single storage entity instead of access to multiple, smaller storage entities. Thus, though the analysis component 110 and the storage component 126 are illustrated as being included within the memory 304, components of the memory 304 are not necessarily all completely contained in the same storage device at the same time. Further, although these components are illustrated as being separate entities, in other embodiments some of these components, portions of some of these components, or all of these components may be packaged together.

In an embodiment, the interactive event tracking environment 100 includes instructions that execute on the CPU 302 or instructions that are interpreted by instructions that execute on the CPU 302 to carry out the functions as further described in this disclosure. In another embodiment, the components of the interactive event tracking environment 100 are implemented in hardware via semiconductor devices, chips, logical gates, circuits, circuit cards, and/or other physical hardware devices in lieu of, or in addition to, a processor-based system. In another embodiment, the interactive event tracking environment 100 includes data in addition to instructions.

Although the memory bus 303 is shown in FIG. 3 as a single bus structure providing a direct communication path among the CPUs 302, the memory subsystem 304, the display system 306, the bus interface 307, and the input/output bus interface 310, the memory bus 303 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 310 and the input/output bus 308 are shown as single respective units, the computer system 300 may, in some embodiments, contain multiple input/output bus interface units 310, multiple input/output buses 308, or both. Further, while multiple input/output interface units are shown, which separate the input/output bus 308 from various communications paths running to the various input/output devices, in other embodiments some or all of the input/output devices may be connected directly to one or more system input/output buses.

The computer system 300 may include a bus interface unit 307 to handle communications among the processor 302, the memory 304, a display system 306, and the input/output bus interface unit 310. The input/output bus interface unit 310 may be coupled with the input/output bus 308 for transferring data to and from the various input/output units. The input/output bus interface unit 310 communicates with multiple input/output interface units 312, 314, 316, and 318, which are also known as input/output processors (IOPs) or input/output adapters (IOAs), through the input/output bus 308. The display system 306 may include a display controller. The display controller may provide visual, audio, or both types of data to a display device 305. The display system 306 may be coupled with a display device 305, such as a standalone display screen, computer monitor, television, or a tablet or handheld device display. In alternate embodiments, one or more of the functions provided by the display system 306 may be on board a processor 302 integrated circuit. In addition, one or more of the functions provided by the bus interface unit 307 may be on board a processor 302 integrated circuit.

In some embodiments, the computer system 300 is a multi-user mainframe computer system, a single-user system, or a server computer or similar device that has little or no direct user interface, but receives requests from other computer systems (clients). Further, in some embodiments, the computer system 300 is implemented as a desktop computer, portable computer, laptop or notebook computer, tablet computer, pocket computer, telephone, smartphone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, Components other than or in addition to those shown in FIG. 3 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private Cloud: the cloud infrastructure is operated solely for an organization. It may be managed by the organization or a third party and may exist on-premises or off-premises.

Community Cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public Cloud: the cloud infrastructure is made available to the general public or a large industry group and is owned by an organization selling cloud services.

Hybrid Cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
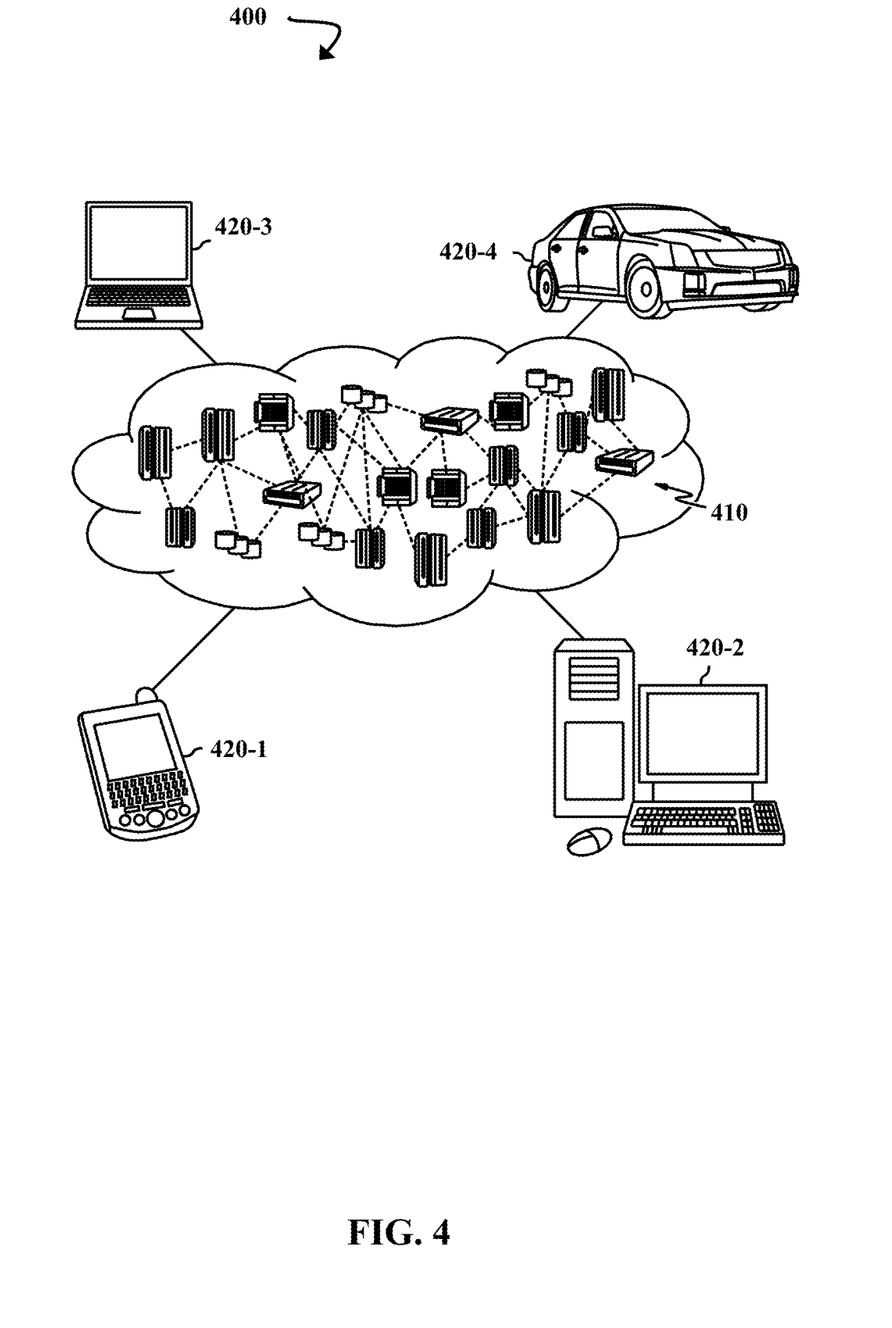
FIG. 4 is a block diagram illustrating a cloud computing environment, according to some embodiments of the present disclosure.

FIG. 4 is a block diagram illustrating a cloud computing environment 400, according to some embodiments of the present disclosure. As shown, cloud computing environment 400 includes one or more cloud computing nodes 410 with which local computing devices used by cloud consumers, such as, for example, a personal digital assistant (PDA) or cellular telephone 420-1, a desktop computer 420-2, a laptop computer 420-3, and/or an automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420-1-420-4 shown in FIG. 4 are intended to be illustrative only and that computing nodes 410 and cloud computing environment 400 can communicate with any type of computerized device over any type of network and/or network addressable connection (e.g., using a web browser).

Figure 5:
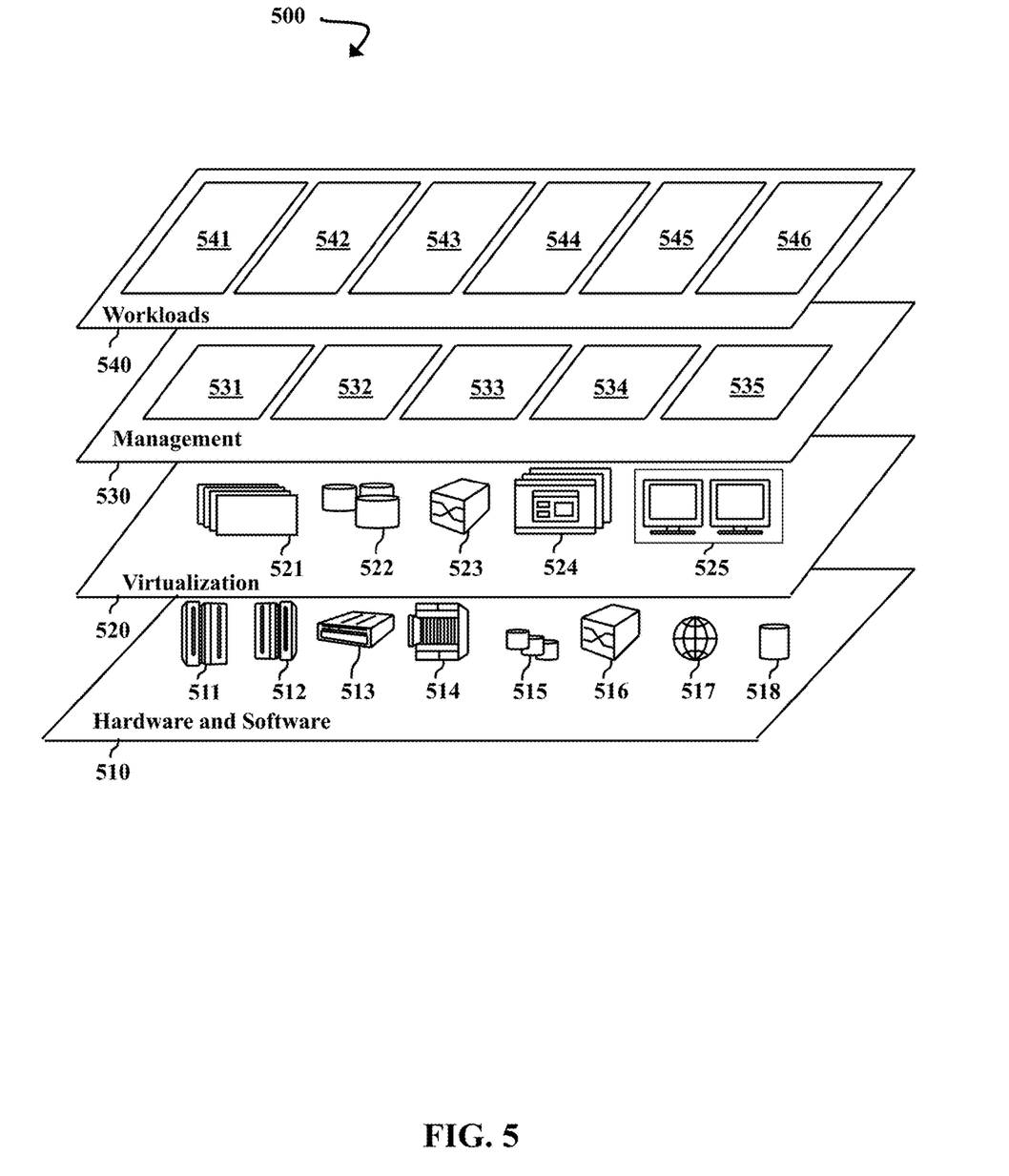
FIG. 5 is a block diagram illustrating a set of functional abstraction model layers provided by the cloud computing environment, according to some embodiments of the present disclosure.

FIG. 5 is a block diagram illustrating a set of functional abstraction model layers 500 provided by the cloud computing environment 400, according to some embodiments of the present disclosure. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 provides the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment can be utilized. Examples of workloads and functions that can be provided from this layer include mapping and navigation 541; software development and lifecycle management 542; virtual classroom education delivery 543; data analytics processing 544; transaction processing 545; and tracking interactive event data 546.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out steps of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and step of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for tracking interactive events, comprising:
   at least one processing component; at least one memory component;
   a set of training data comprising defined facial expressions; and
   an analysis component, comprising:
   a detection module, including circuitry, configured to:
   detect a new facial expression in facial expression data collected by at least one image sensor; and
   in response to the detecting, record the new facial expression and interactive event data, recorded by at least one interactive device, that corresponds to the new facial expression;
   an expression classifier configured to: recognize the new facial expression based on the set of training data; and
   in response to the recognizing, assign a definition associated with a defined facial expression to the new facial expression; and
   a tagging module, including circuitry, configured to:
   tag the interactive event data that corresponds to the new facial expression with the definition.

2. The system of claim 1, wherein the tagging module is further configured to add the tagged corresponding interactive event data to a set of profile data.

3. The system of claim 1, wherein the set of training data is updated to include the new facial expression and the definition.

4. The system of claim 3, wherein the expression classifier is retrained on the updated set of training data.

5. The system of claim 1, wherein the expression classifier is further configured to determine that the defined facial expression matches the new facial expression.

6. The system of claim 1, wherein the expression classifier is further configured to determine that the defined facial expression is most similar to the new facial expression.

7. A method of tracking interactive events, comprising:
   receiving facial expression data and interactive event data;
   detecting a new facial expression in the facial expression data;
   in response to the detecting, recording the new facial expression and interactive event data that corresponds to the new facial expression;
   recognizing the new facial expression based on a set of training data;
   in response to the recognizing, assigning a definition to the new facial expression; and
   tagging the interactive event data that corresponds to the new facial expression with the definition.

8. The method of claim 7, wherein the recognizing comprises determining that the new facial expression matches a defined facial expression in the set of training data.

9. The method of claim 7, wherein the recognizing comprises:
   determining that the new facial expression does not match any defined facial expressions in the set of training data; and
   locating a defined facial expression in the set of training data that is most similar to the new facial expression.

10. The method of claim 7, further comprising updating the set of training data with the new facial expression and the definition.

11. The method of claim 7, further comprising updating a set of profile data with the interactive event data that corresponds to the new facial expression.

12. The method of claim 7, wherein the interactive event data that corresponds to the new facial expression is a selection of a link.

13. The method of claim 7, further comprising tagging the interactive event data that corresponds to the new facial expression with information related to the interactive event data that corresponds to the new facial expression.

14. The method of claim 13, wherein the information includes a category of website.

15. A computer program product for interactive event tracking, the computer program product comprising a computer readable storage medium having program instructions embodied therewith, the program instructions executable by a processor to cause a device to perform a method comprising:
   receiving facial expression data and interactive event data;
   detecting a new facial expression in the facial expression data;
   in response to the detecting, recording the new facial expression and interactive event data that corresponds to the new facial expression;
   recognizing the new facial expression based on a set of training data;
   in response to the recognizing, assigning a definition to the new facial expression; and
   tagging the interactive event data that corresponds to the new facial expression with the definition.

16. The computer program product of claim 15, wherein the recognizing comprises determining that the new facial expression matches a defined facial expression in the set of training data.

17. The computer program product of claim 15, wherein the recognizing comprises:
   determining that the new facial expression does not match any defined facial expressions in the set of training data; and
   locating a defined facial expression in the set of training data that is most similar to the new facial expression.

18. The computer program product of claim 15, further comprising updating the set of training data with the new facial expression and the definition.

19. The computer program product of claim 15, further comprising updating a set of profile data with the interactive event data that corresponds to the new facial expression.

20. The computer program product of claim 15, further comprising tagging the interactive event data that corresponds to the new facial expression with information related to the interactive event data that corresponds to the new facial expression.

* * * * *